No. 12,499. REISSUED JUNE 26, 1906.

J. P. EUSTIS.

BATH TUB SEAT.

APPLICATION FILED MAR. 31, 1906.

2 SHEETS—SHEET 1.

Attest:

C. Mitchell

Olive B. Mug

John P. Eustis,

Inventor:

by Geo. H. Whitlock,

Atty.

No. 12,499. REISSUED JUNE 26, 1906.

J. P. EUSTIS.

BATH TUB SEAT.

APPLICATION FILED MAR. 31, 1906.

2 SHEETS—SHEET 2.

Attest:

Alice B. King

John P. Eustis,

Inventor:

by Geo. L. Wheelock,

Atty

UNITED STATES PATENT OFFICE.

JOHN P. EUSTIS, OF NEWTONVILLE, MASSACHUSETTS.

BATH-TUB SEAT.

No. 12,499. Specification of Reissued Letters Patent. Reissued June 26, 1906.

Original No. 764,232, dated July 5, 1904. Application for reissue filed March 31, 1906. Serial No. 309,232.

*To all whom it may concern:*

Be it known that I, JOHN P. EUSTIS, a citizen of the United States, residing at Newtonville, in the county of Middlesex and State of Massachusetts, have invented certain new and useful Improvements in Bath-Tub Seats, of which the following is a specification, reference being had therein to the accompanying drawings.

Figure 1:
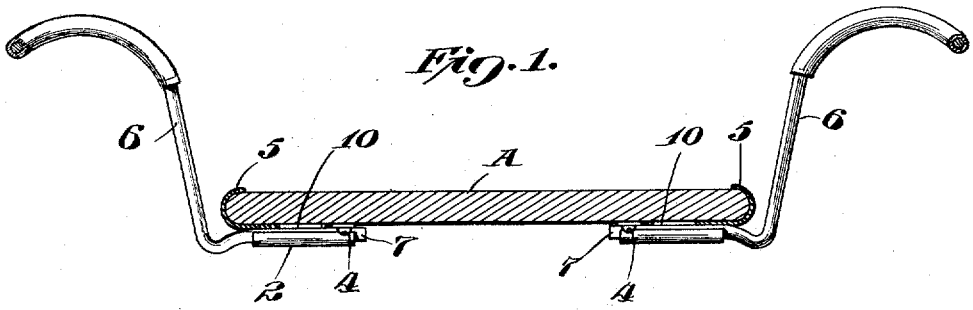
Figure 2:
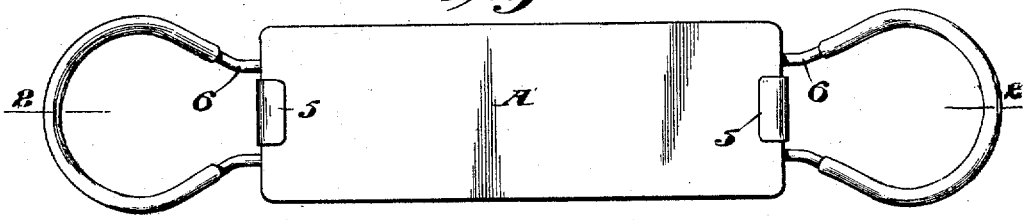
Figure 3:
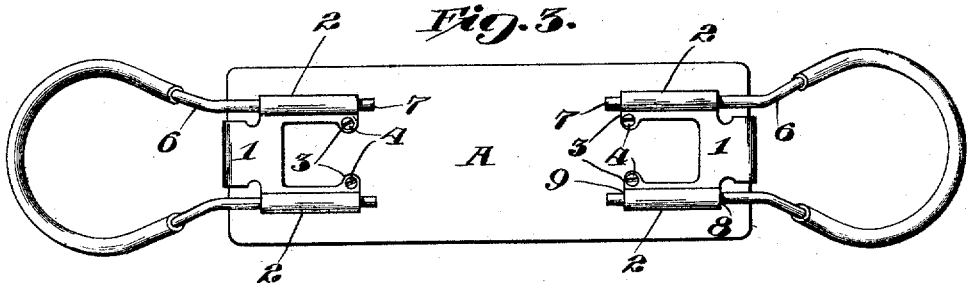
Figure 4:
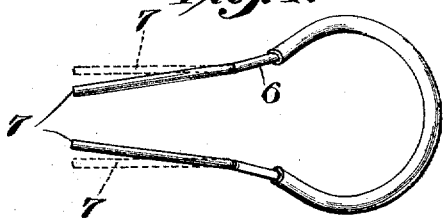
Figure 5:
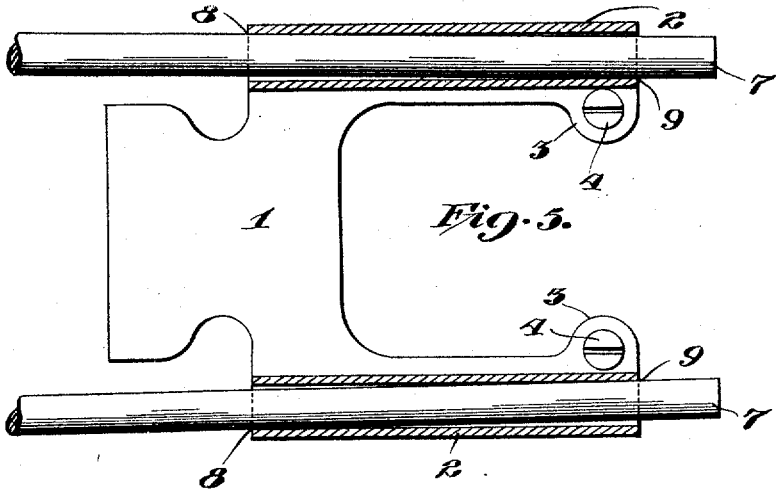
Figure 6:
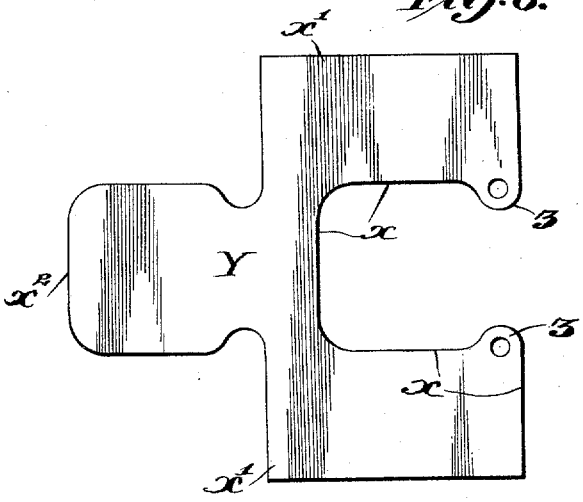

Figure 1 is a lengthwise central section of my improved bath-tub seat complete at line 2 2 of Fig. 2. Fig. 2 is a top plan view, and Fig. 3 is an under plan view, of the complete seat. Fig. 4 is an under plan view of my new form of bent-rod hanger detached from the seat, the dotted lines indicating outward instead of inward relative inclination of the arms. Fig. 5 is an enlarged view of a portion of the hanger-bracket and shows the points at which the hanger-arms telescopically contact with the open-ended tubular portions of the bracket. Fig. 6 is a plan view of a sheet-metal blank, showing the lines of cut requisite to produce a plurality of bracket-forming blanks from a sheet of metal without waste of stock.

Bath-tub seats when used are suspended from the upper margins of bath-tubs and are subjected to a considerable variety of strains occasioned by persons moving when sitting on the seats. The seats must be made strong for safety, light for convenience, and have hangers which are adjustable with ease, so as to fit tubs of varying widths.

The object of my invention is to produce strong, durable, and readily-adjustable bath-seats which are strong enough to be safe and light enough to be conveniently handled.

In the drawings, A is the seat-board, and 1 is the hanger-receiving bracket, which is preferably formed with two parallel integral open-ended tubular portions 2, within which the arms of the hanger are telescopically received and adjustable. The seat-board is thus provided with two tubular portions or sockets at each end.

3 represents lobes, preferably at the inner ends of the brackets and bored for the reception of screws 4, which enter the seat-board A and clamp the inner ends of the brackets tight to the under side of the board, while the integral hook extension 5 passes over the end of the seat-board and hooks tightly on the upper margin of the seat-board. The bracket-hook 5 and the screws 4 coöperate to bind the hanger-bracket firmly in place and to prevent twisting of the hanger-bracket on the seat-board, at the same time binding the inner ends of the brackets snugly to the under side of the seat-board.

The hangers 6 are conveniently formed of metallic rods and according to my invention are formed with arms 7 7 of lesser diameter than the interior diameter of the tubular portions or sockets 2, so that the arms 7 7 may be readily entered and adjusted in the tubular portions or sockets 2 2; but these hanger-arms 7 7 are when the hanger is detached at an inclination one to the other, in process of production being set in an inclined position one in relation to another, as shown, for example, in Fig. 4, and it is only by moving the arms 7 7 laterally against the resiliency of the intermediate portion of a hanger that the arms 7 7 can be entered in the tubular portions or sockets 2 2 whatever the relative inclination of the arms one in relation to the other may be.

When hangers and seat-board are assembled, the arms 7 7 spring apart and are arranged diagonally in the tubular portions or sockets 2 2. In consequence of the diagonal arrangement of the arms 7 7 within the parallel tubular portions, hanger-receiving tubes, or sockets 2 2 the only points of contact between the arms and inner surfaces of the tubular portions or sockets 2 2 if the arms are permitted to and do pass through are at opposite end portions of the tubular parts or sockets 2 2 at 8 8 and 9 9, except, however, that there is substantially a line of continuous contact between the upper side of each hanger-arm 7 and the opposed inner surface of the tubular portions 2 2, as indicated at 10 10, when the seat is sat upon. By this construction while a telescopic connection is obtained between the hanger-arms 7 7 and the tubular portions or sockets 2 2 the points of contact between the arms 7 7 and inner surfaces of the tubular portions or sockets 2 2 are minimized, and this is important to prevent such rusting together of the opposed parts as will seriously interfere with the adjustability of the hangers in relation to the seat-board.

In manufacturing seats embodying my invention in the form as shown it becomes unnecessary to go to the expense of boring two holes in each end of the seat-board, an operation that is attended with peculiar difficulties and expense, and I find that by using sheet-metal plates of proper dimensions and cutting the flat sheet on the lines $x$ the sheet may be cut into a plurality of bracket-forming blanks Y without waste of stock, the lobes 3 being perforated and the tube-forming portions $x'$ being rolled to form the hanger-receiving tubes 2 2 of the finished bracket and the hook-forming lobe $x^2$ being bent to form the hook 5 of the finished bracket. The bracket is readily produced without waste of stock and at a low cost of manufacture.

What I claim is—

1. In a bath-tub seat, the combination of a seat-board, provided with a pair of tubular portions or hanger-receiving sockets at each end; and a hanger for each pair of tubular portions or sockets; the hangers being formed with arms which are inclined, one in relation to the other, and telescopically enter said tubular portions or sockets wherein the arms are partially out of contact with the inner walls of the tubular portions or sockets.

2. In a bath-tub seat, the combination of a seat-board; a hanger-bracket at each end thereof, adapted to be secured to the seat-board, and having, on the under side of the seat-board, a pair of hanger-receiving tubes; and a hanger for each bracket; the hangers being formed with arms which telescopically enter said tubes.

3. In a bath-tub seat, the combination of a seat-board; a hanger-bracket at each end thereof, adapted to be secured to the seat-board, and having, on the under side of the seat-board, a pair of hanger-receiving tubes; and a hanger for each bracket; the hangers being formed with arms which are inclined, one in relation with the other, and telescopically enter said tubes wherein the arms are partially out of contact with the inner walls of the tubes.

4. In a bath-tub seat, the combination of a seat-board; a hanger-bracket at each end thereof; fasteners for securing the brackets to the seat-board; and a hanger for each bracket; each bracket having on the under side of the seat-board a pair of hanger-receiving tubes; the hangers being formed with arms which telescopically enter said tubes.

5. In a bath-tub seat, the combination of a seat-board; a hanger-bracket at each end thereof; fasteners for securing the brackets to the seat-board; and a hanger for each bracket; each bracket having a hooked end which laps over an end of the seat-board and also having, on the under side of the seat-board, a pair of hanger-receiving tubes; the hangers being formed with arms which are inclined, one in relation to the other, and telescopically enter said tubes wherein the arms are partially out of contact with the inner walls of the tubes.

6. As a new article of manufacture, the herein-described sheet-metal, bracket-forming blank having a hook-forming lobe at one of its ends, and a pair of tube-forming portions at a distance from said lobe and at opposite sides of the blank.

In testimony whereof I affix my signature in the presence of two witnesses.

JOHN P. EUSTIS.

Witnesses:
THOMAS M. KEEFE,
F. A. COAN.